US008866865B2

(12) United States Patent
Maeda

(10) Patent No.: US 8,866,865 B2
(45) Date of Patent: Oct. 21, 2014

(54) IMAGE FORMING APPARATUS AND TURN-ON TIME CORRECTION METHOD

(75) Inventor: Katsuhiko Maeda, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 556 days.

(21) Appl. No.: 13/050,563

(22) Filed: Mar. 17, 2011

(65) Prior Publication Data

US 2011/0228030 A1  Sep. 22, 2011

(30) Foreign Application Priority Data

Mar. 18, 2010  (JP) .................................. 2010-062058
Mar. 7, 2011   (JP) .................................. 2011-049291

(51) Int. Cl.
*B41J 2/435* (2006.01)
*B41J 2/47* (2006.01)
*G03G 15/32* (2006.01)
*G02B 26/12* (2006.01)
*G03G 15/043* (2006.01)

(52) U.S. Cl.
CPC ............... *B41J 2/471* (2013.01); *G03G 15/326* (2013.01); *G02B 26/127* (2013.01); *G03G 15/043* (2013.01)
USPC ............ 347/237; 347/236; 347/246; 347/247

(58) Field of Classification Search
USPC .................................. 347/236, 237, 246, 247
See application file for complete search history.

(56) References Cited

U.S. PATENT DOCUMENTS

| 6,831,672 | B2 | 12/2004 | Maeda |
| 6,833,856 | B2 | 12/2004 | Maeda |
| 6,847,390 | B2 | 1/2005 | Maeda |
| 6,853,392 | B2* | 2/2005 | Maeda ........................... 347/116 |
| 6,999,708 | B2 | 2/2006 | Maeda |
| 7,215,353 | B2 | 5/2007 | Maeda |
| 7,224,378 | B2 | 5/2007 | Maeda |
| 7,294,824 | B2 | 11/2007 | Maeda |
| 7,313,352 | B2 | 12/2007 | Shinohara et al. |
| 7,415,231 | B2 | 8/2008 | Maeda |
| 7,595,812 | B2 | 9/2009 | Maeda |
| 7,679,634 | B2 | 3/2010 | Komai et al. |
| 7,760,222 | B2 | 7/2010 | Maeda |
| 8,144,177 | B2* | 3/2012 | Takahashi et al. ............. 347/237 |
| 8,164,611 | B2* | 4/2012 | Yamashita ..................... 347/236 |
| 2007/0210245 | A1 | 9/2007 | Maeda |
| 2010/0238261 | A1 | 9/2010 | Maeda |

FOREIGN PATENT DOCUMENTS

| JP | 9-200522 | 7/1997 |
| JP | 11-78117 | 3/1999 |
| JP | 2003-39722 | 2/2003 |

* cited by examiner

*Primary Examiner* — Rhonda Peace
*Assistant Examiner* — John M Bedtelyon
(74) *Attorney, Agent, or Firm* — Oblon, Spivak, McClelland, Maier & Neustadt, L.L.P.

(57) ABSTRACT

An image forming apparatus includes a light source that emits light beams for scanning a photoconductive element and for image forming of image data, a storage unit that stores a correction amount of a turn-on time of the light source associated with a preset turn-on pattern of the light beams, an acquiring unit that compares a pattern of the image data with the turn-on pattern, so as to acquire the correction amount corresponding to the pattern of the image data which is associated with the turn-on pattern, from the storage unit; and a light source controller that controls turn-on of the light source by a turn-on time corrected with acquired correction amount.

19 Claims, 13 Drawing Sheets

IMAGE FORMING APPARATUS AND TURN-ON TIME CORRECTION METHOD

CROSS-REFERENCE TO RELATED APPLICATIONS

The present application claims priority to and incorporates by reference the entire contents of Japanese Patent Application No. 2010-062058 filed in Japan on Mar. 18, 2010 and Japanese Patent Application No. 2011-049291 filed in Japan on Mar. 7, 2011.

BACKGROUND OF THE INVENTION

1. Field of the Invention

The present invention relates to an image forming apparatus and a turn-on time correction method.

2. Description of the Related Art

An image forming apparatus provided with a Vertical Cavity Surface Emitting Laser (VCSEL) of which turn-on is controlled according to image data may have the following cases. That is, when the VCSEL is turned on, it may take time for the light emitted therefrom to reach a specified amount of light because of its slow rise time, or the specified amount of light may be obtained after overshoot of the amount of light. In the former, image density decreases, while in the latter, the image density increases. Therefore, if the response characteristic changes for each of a plurality of light sources in the VCSEL, this causes uneven density or irregular color.

From the reasons above, there is disclosed a technology for obtaining an image without uneven image density by emitting light sources to detect an integrated light amount and controlling the light emitting pulse width or controlling the voltage and current to drive the light sources based on the result of detection (see, for example, Japanese Patent Application Laid-open No. 2003-039722, Japanese Patent Application Laid-open No. H9-200522, and Japanese Patent Application Laid-open No. H11-078117).

More specifically, an image forming apparatus according to Japanese Patent Application Laid-open No. 2003-039722 is configured so that a detector detects the integrated light amount of laser diodes (LDs) for a plurality of levels of pulse widths for each LD and a controller controls the bias and the pulse width for each LD based on the result of detection by the detector.

An image forming apparatus according to Japanese Patent Application Laid-open No. H9-200522 is configured so that a monitor circuit monitors an emission intensity of LD and a correction circuit integrates outputs of the monitor circuit to determine an integrated light amount and controls an integrated light amount based on the determined integrated light amount.

An image forming apparatus according to Japanese Patent Application Laid-open No. H11-078117 is configured so that a part of light beam is guided to a photoelectric conversion device through a half mirror and the photoelectric conversion device converts a value of light accumulated at each light-emitting points, entering during a period specified by a timing signal received from a control device, to an electrical signal. A controller refers to the accumulated light value signal to adjust the voltage and current to drive the light source or to adjust an optical pulse width so as to be equal to the reference level. This results in correction of variations among the light-emitting points and of changes due to temperature, thus improving image quality.

However, the response characteristic of each of the light sources changes caused by not only a factor such as temperature but also the amount of light to be emitted, and further changes also caused by a turn-off time before starting of the emission. When an image is actually formed, the amount of light is changed by process control, and the turn-off time is also changed caused by the image data. As a result, even if the process control is implemented to change the amount of light in order to improve the image quality, the image quality decreases depending on the change in the response characteristic of the light source according to the change in the amount of light. In addition, the change in the response characteristic of the light source according to the turn-off time that changes according to the image data may cause uneven image density.

SUMMARY OF THE INVENTION

It is an object of the present invention to at least partially solve the problems in the conventional technology.

According to an aspect of the present invention, there is provided an image forming apparatus including: a light source that emits light beams for scanning a photoconductive element and for image forming of image data; a storage unit that stores a correction amount of a turn-on time of the light source associated with a preset turn-on pattern of the light beams; an acquiring unit that compares a pattern of the image data with the turn-on pattern, so as to acquire the correction amount corresponding to the pattern of the image data which is associated with the turn-on pattern, from the storage unit; and a light source controller that controls turn-on of the light source by a turn-on time corrected with acquired correction amount.

According to another aspect of the present invention, there is provided a turn-on time correction method implemented by an image forming apparatus, wherein the image forming apparatus including: a light source that emits light beams for scanning a photoconductive element and for image forming of image data; and a storage unit that stores a correction amount of a turn-on time of the light source associated with a preset turn-on pattern of the light beams, and the turn-on time correction method including: comparing a pattern of the image data with the turn-on pattern, and acquiring the correction amount corresponding to the pattern of the image data which is associated with the turn-on pattern, from the storage unit; and controlling turn-on of the light source by a turn-on time corrected with acquired correction amount.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The present invention relates to an image forming apparatus and a turn-on time correction method that correct a turn-on time of a light source based on a response characteristic of the light source used for image formation.

Exemplary embodiments of an image forming apparatus and a turn-on time correction method to which the present invention is applied will be explained in detail below with reference to the accompanying drawings.

First Embodiment

Figure 1:
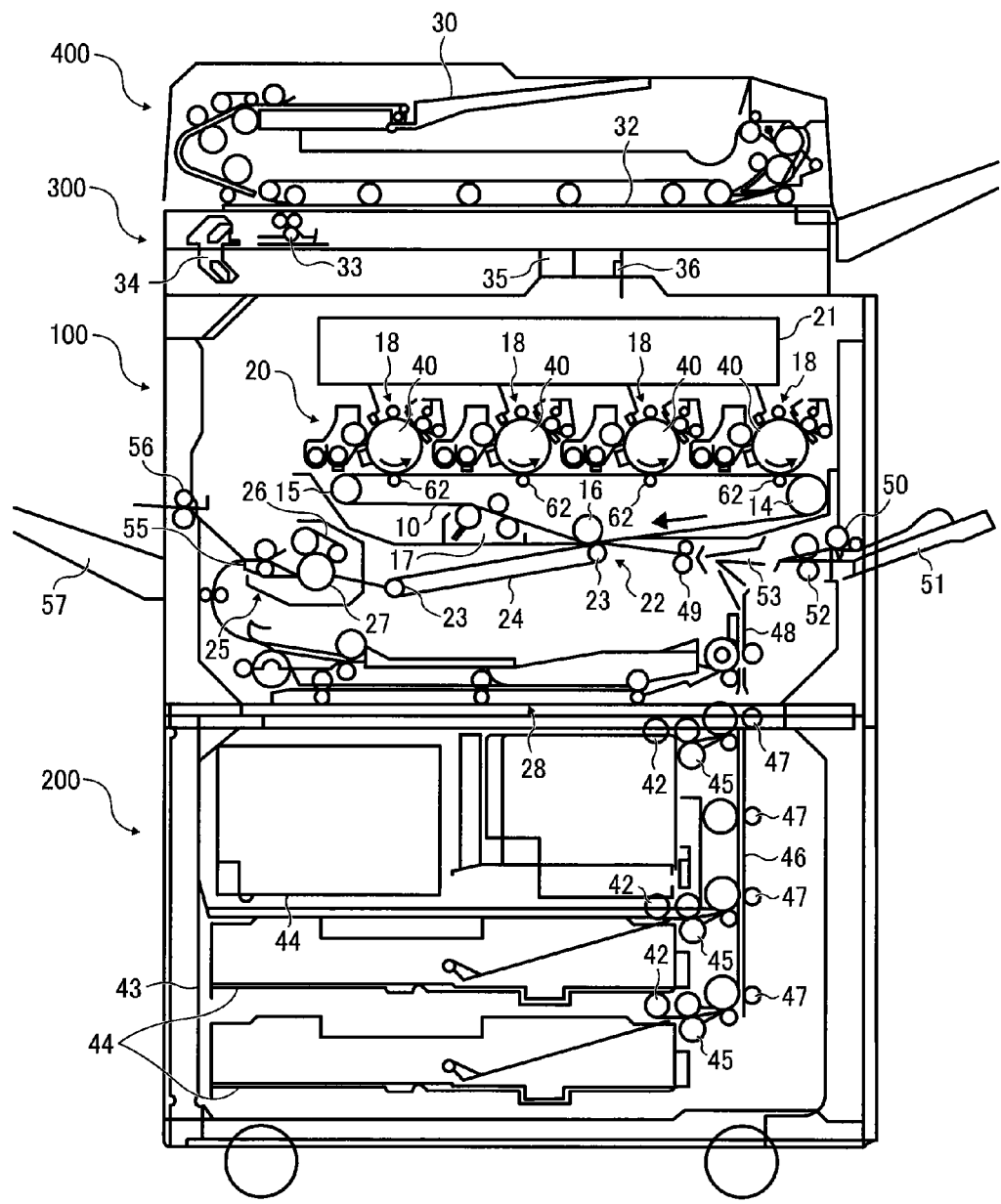
FIG. 1 is a diagram illustrating a mechanism (outline) of a copy machine as an image forming apparatus according to a first embodiment.

FIG. 1 is a diagram illustrating a mechanism (outline) of a copy machine 100 as an image forming apparatus according to a first embodiment of the present invention. The copy machine 100 includes an intermediate transfer unit (not shown) in its center portion, and the intermediate transfer unit includes an intermediate transfer belt 10 being an endless belt. The intermediate transfer belt 10 is wound around three support rollers 14 to 16, and is driven to rotate in the clockwise.

Provided in the right side of the second support roller 15 is an intermediate-transfer-body cleaning unit 17 for removing residual toner remaining on the intermediate transfer belt 10 after an image is transferred. Provided along a moving direction of the intermediate transfer belt 10 between the first support roller 14 and the second support roller 15 is an imaging device 20 that include photo conductor drum 40 for colors of yellow (Y), magenta (M), cyan (C), and black (Bk), charger 18, transfer unit 62, developing unit 77 (see FIG. 2), cleaning unit 79 (see FIG. 2), and decharger 80 (see FIG. 2). The imaging device 20 is removably attached to the main body of the copy machine.

Provided above the imaging device 20 is a light-beam scanning device 21 that irradiates laser lights to form images on the photo conductor drums 40 respectively.

Provided below the intermediate transfer belt 10 is a secondary transfer unit 22. The secondary transfer unit 22 is disposed in such a manner that a secondary transfer belt 24 being an endless belt is wound around between two rollers 23 to push the intermediate transfer belt 10 upward, so that the intermediate transfer belt 10 is pressed against the third support roller 16. An image on the intermediate transfer belt 10 is transferred to a recording paper on the secondary transfer belt 24. Disposed next to the secondary transfer unit 22 is a fixing unit 25 for fixing a transferred image on the recording paper, and the recording sheet to which the toner image is transferred is fed into the fixing unit 25. The fixing unit 25 is configured so that a heating and pressing roller 27 is pressed against a fixing belt 26 being an endless belt. Provided below the secondary transfer unit 22 and the fixing unit 25 is a sheet reversing unit 28 for turning upside down the recording paper immediately after the image is formed on its top side and feeding the recording paper into the secondary transfer unit 22 to record an image on its backside.

The copy machine 100 also includes a control unit (not shown), an image reading unit 300 provided with a scanner, an automatic document feeder (ADF) 400, a first carriage 33, a second carriage 34, an imaging lens 35, and a charge-coupled device (CCD) 36. When a start switch in the control unit is pressed and if a document is set on a document feeder tray 30 of the ADF 400, the ADF 400 feeds the document to a contact glass 32. On the other hand, if no document is set on the ADF 400, the ADF 400 drives the scanner of the image reading unit 300 and drives the first carriage 33 and the second carriage 34 to scan in order to read the original set on the contact glass 32. The light is emitted from a light source on the first carriage 33 to the contact glass 32 and the light reflected from the surface of the document is reflected by a mirror (not shown) on the first carriage 33 to direct toward the second carriage 34, is reflected by a mirror (not shown) on the second carriage 34, passes through the imaging lens 35, and is formed as an image on the CCD 36 being a reading sensor. Recording data for the Y, M, C, and BK colors are generated based on image signals (image data) obtained by the CCD 36.

When the start switch of the control unit is pressed, when image output is instructed from a personal computer or the like, or when output of FAX (facsimile) is instructed, rotation of the intermediate transfer belt 10 is started and imaging preparation of the units in the imaging device 20 is started. Each imaging sequence of imaging for the colors is started, an exposing laser modulated based on each of the recording data for the colors is irradiated to each of the photo conductor drums 40. Then, through respective imaging processes, toner images of the colors are transferred to the intermediate transfer belt 10 in a superimposed manner so as to obtain one image thereon. In other words, latent images of the colors are visualized. When the leading edge of the toner image is entering the secondary transfer unit 22, the recording paper as a recording medium is fed into the secondary transfer unit 22 at an appropriate timing so that the leading edge of the recording paper enters the secondary transfer unit 22 simultaneously. This allows the toner image on the intermediate transfer belt to be transferred to the recording paper. The recording paper with the toner image thereon is fed into the fixing unit 25, where the toner image is fixed on the recording paper.

The recording paper is fed from one of multistage paper feed trays 44, provided in a paper feed unit 43, which is selectively driven to rotate by one of paper feed rollers 42 of a paper feed table 200. Only one sheet is separated from the recording papers by a separation roller 45, is put into a conveying roller unit 46, and is conveyed by a conveying roller 47 to be guided into a conveying roller unit 48 in the copy machine 100. The recording paper hits a registration roller 49 in the conveying roller unit 48 and is stopped thereby, and is fed into the secondary transfer unit 22 at the above timing. However, a user can insert a recording paper onto a manual feed tray 51 to feed the recording paper. When the user is inserting recording papers onto the manual feed tray 51, the copy machine 100 rotates a paper feed roller 50 and a paper feed roller 52, separates one sheet from the recording papers on the manual feed tray 51 to be fed into a paper feed path 53, and is also brought to hit the registration roller 49 and stopped.

The recording paper subjected to a fixing process in the fixing unit 25 and ejected is guided to ejection rollers 56 by a switching claw 55, and is stacked on a paper ejection tray 57. The recording paper is also guided to the sheet reversing unit 28 by the switching claw 55, is reversed in the sheet reversing unit 28 to be guided again to the transfer position, where an image is recorded on its backside, and then the recording paper is ejected by the ejection rollers 56 onto the paper ejection tray 57.

Meanwhile, the residual toner remaining on the intermediate transfer belt 10 after the image is transferred is removed by the intermediate-transfer-belt cleaning unit 17, and the intermediate transfer belt is prepared for the next image formation.

Figure 2:
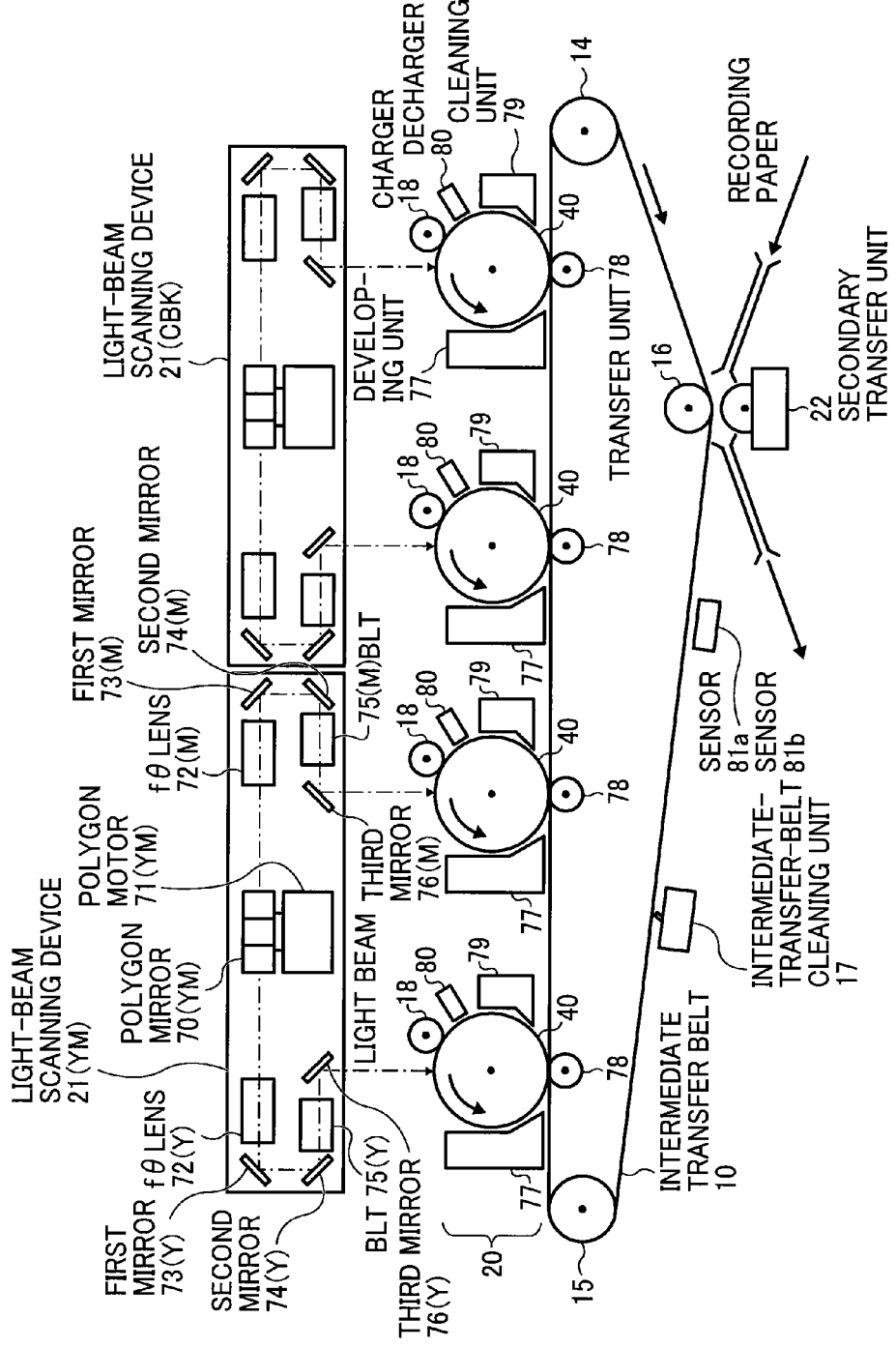
FIG. 2 is a diagram of a detailed configuration of an imaging device and a light-beam scanning device.

FIG. 2 is a diagram of a detailed configuration of the imaging device 20 and the light-beam scanning device 21. As shown in FIG. 2, the imaging device 20 includes four sets of image forming unit (including the photo conductor drums 40, the chargers 18, the developing units 77, the transfer units 78, cleaning units 79, and dechargers 80) to form color images in which images of the four colors (yellow (Y), magenta (M), cyan (C), and black (Bk)) are superimposed on one another. The light-beam scanning device 21 includes a light-beam scanning device 21 (YM) for yellow and magenta and a light-beam scanning device 21 (CBK) for cyan and black. In the following, when the colors are not specified, each of the configurations is described without (Y), (M), (C), (BK), (YM), and (CBK).

The two light-beam scanning devices 21 have the same configuration as each other. Each of the light-beam scanning devices 21 uses one polygon mirror 70, to deflect and scan light beams of different colors by the polygon mirror plane, and to oppositely and separately scan the light beams centered on the polygon mirror 70, so that the light beams for two colors scan respective photo conductor drums 40. A light source unit 82 (see FIG. 3) that is drive-modulated according to image data and that selectively emits a light beam is provided for each of the colors. The light beam emitted from the light source unit 82 is deflected by the polygon mirror 70 rotated by a polygon motor 71, passes through a fθ lens 72, is reflected by a first mirror 73 and a second mirror 74 to pass through a BTL 75, and is reflected by a third mirror 76, to scan the photo conductor drum 40.

BTL is an abbreviation of Barrel Toroidal Lens that focuses in the sub-scanning direction (performing a light collecting function and correcting a position (surface tilt, etc.)). In addition, a synchronization detection sensor 86 (see FIG. 3) is provided in a position more forward than an image writing position in a non-image writing area in a main scanning direction. The synchronization detection sensor 86 outputs a synchronous detection signal to set a timing of starting writing in the main scanning direction by receiving the light beam deflected by the polygon mirror 70.

The main scanning direction represents a direction in which light beams emitted from a plurality of light sources 1 to 20 (see FIG. 5) are deflectively scanned by the rotation of the polygon mirror 70. The sub-scanning direction represents a rotation direction of the photo conductor drum 40.

Arranged around each of the photo conductor drums 40 are the charger 18, the developing unit 77, the transfer unit 78, the cleaning unit 79, and the decharger 80. The imaging device 20 forms a first-color image on the intermediate transfer belt 10 through charging, exposing, developing, and transferring which are ordinary electrophotographic processes. Next, second-color, third-color, and fourth-color images are sequentially transferred thereto, and the four-color images are superimposed on one another to form a color image. The secondary transfer unit 22 shown in FIG. 1 then transfers the color image formed on the intermediate transfer belt 10 to the conveyed recording paper, so that the color image with the four-color superimposed images can be formed on the recording paper. The fixing unit 25 shown in FIG. 1 fixes the image on the recording paper. The intermediate-transfer-belt cleaning unit 17 removes the toner image from the intermediate transfer belt 10.

Provided near the intermediate transfer belt 10 are a sensor 81*a* and a sensor 81*b* for detecting an image dislocation correction pattern formed on the intermediate transfer belt 10. The sensors 81*a* and 81*b* are reflective photosensors, which detect the image dislocation correction pattern formed on the intermediate transfer belt 10 at two locations in the main scanning direction. Image dislocations in the main scanning direction and the sub-scanning direction between the colors and image magnification in the main scanning direction are corrected based on the result of detection.

Figure 3:
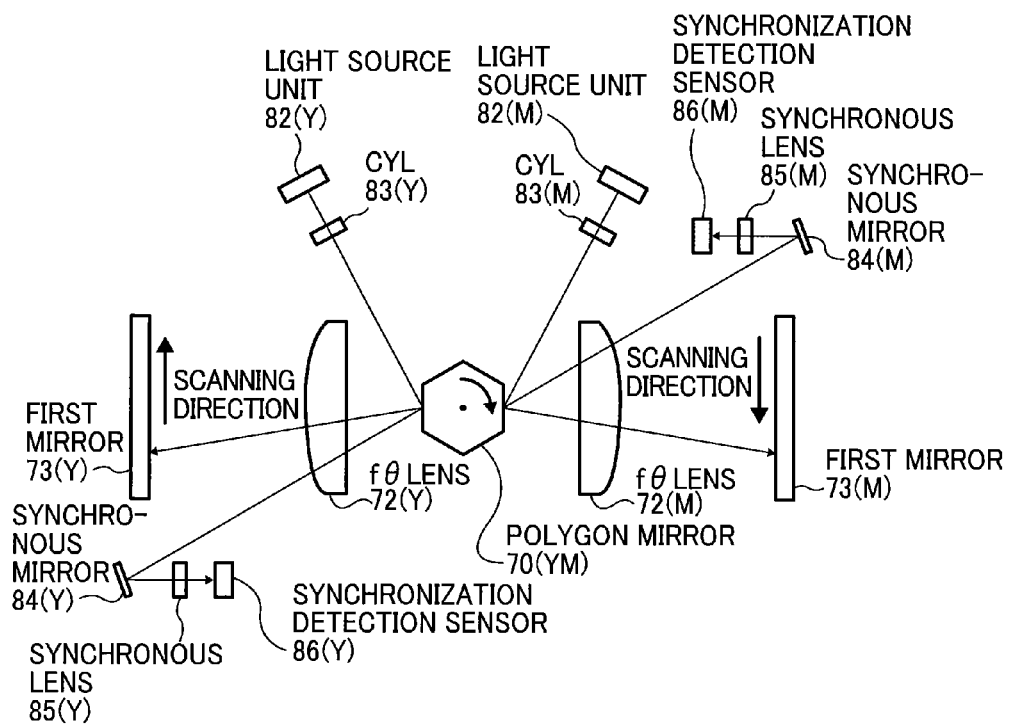
FIG. 3 is a diagram of the light-beam scanning device shown in FIG. 2 when viewed from the above.

FIG. 3 is a top view of the light-beam scanning device 21 shown in FIG. 2. The light beam emitted from the light source unit 82 passes through a CYL (cylinder lens) 83, enters the polygon mirror plane, and is deflected thereby through rotation of the polygon mirror 70. The deflected light beam passes through the fθ lens 72 and is bent by the first mirror 73. Here, a synchronous mirror 84 is provided at the writing side edge in the main scanning direction. The light beam passing through the fθ lens 72 is reflected by the synchronous mirror 84, to enter the synchronization detection sensor 86 through a synchronous lens 85. Here, the synchronization detection sensor 86 functions as a sensor that detects a synchronous detection signal XDETP. As is clear from FIG. 3, the light beam corresponding to magenta (M) is scanned in the opposite direction with respect to yellow (Y).

Figure 4:
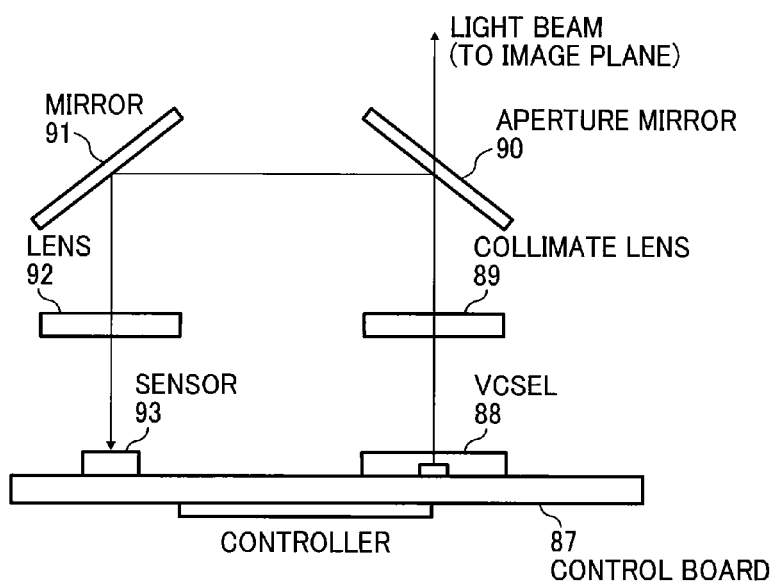
FIG. 4 is a diagram of a configuration of a light source unit.

FIG. 4 is a diagram of a configuration of the light source unit 82. In the light source unit 82, the light beams emitted from VCSEL 88 fixed to a control board 87 are changed to bundle of parallel light beams by a collimate lens 89, and is split by an aperture mirror 90 into a light beam traveling toward an image plane and a light beam for detecting an integrated light amount. The light beam reflected by the aperture mirror 90 is again reflected by a mirror 91, and is converged by a lens 92, to enter a sensor 93 that detects a light amount and an integrated light amount. The control board 87 includes an LD driver 111 (see FIG. 7) that controls turn-on of the VCSEL 88, and a light amount detector 114 (see FIG. 7) that detects the light amount of light beams and the integrated light amount.

Here the integrated light amount is defined as an amount of exposure per predetermined time unit. The integrated light amount will be explained when the predetermined time unit is set to, for example, one pixel. If the emission of the light beams sufficiently follows a modulation signal corresponding to the image signal, the integrated light amount is calculated by multiplying the light amount of the emitted light beams by an emission time per pixel of image. However, if optical modulation of the light beam is performed at a high speed, the emission of the light beam follows insufficiently, which causes rising and falling to become slow. In this case, by integrating the light amounts of emitted light beams with time, the integrated light amount can be determined.

Figure 5:
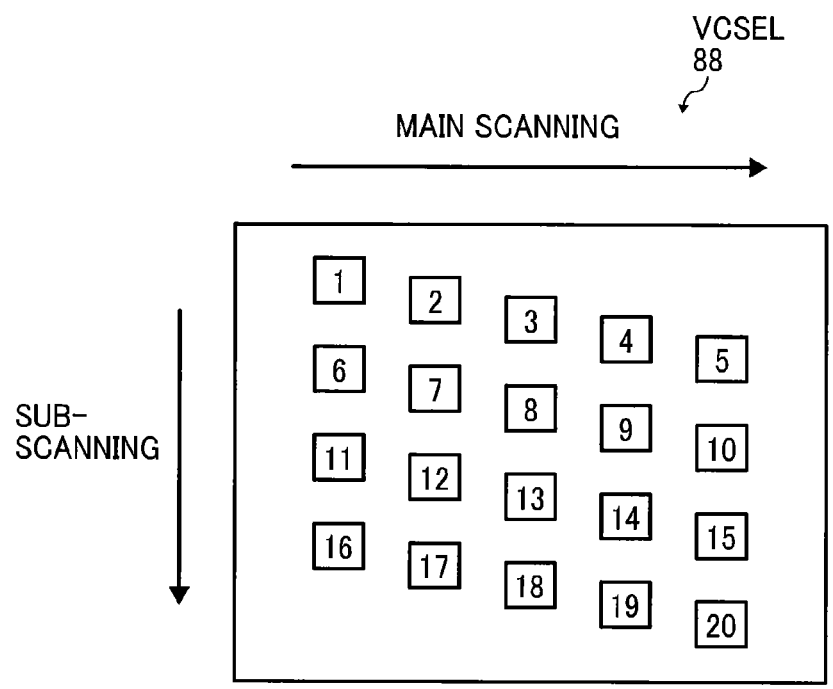
FIG. 5 is a layout of light sources in VCSEL.

FIG. 5 is a layout of light sources in the VCSEL 88. The VCSEL 88 mentioned here represents plane-emission type semiconductor laser with a plurality of semiconductor laser elements (light sources) arranged in a reticular form on one chip. Various technologies are known as an image forming apparatus using such VCSEL 88, and the VCSEL 88 is incorporated in the light source unit of the image forming apparatus according to the present embodiment with the same configuration as that of these known technologies.

As shown in FIG. 5, the VCSEL 88 according to the present embodiment constitutes semiconductor laser arrays in which the light sources 1 to 20 are arranged in the reticular form. A plurality of the light sources 1 to 20 are laid out displaced from each other by a defined pitch in the main scanning direction and the sub-scanning direction.

As shown in FIG. 5, the plurality of the light source 1 to 20 are arranged displaced from each other by a defined pitch in the main scanning direction and the sub-scanning direction, and thereby the light source 1 and the light source 2 expose different scanning positions. A configuration in which one pixel is constituted by the two light sources, in other words, one pixel is realized by the two light sources is considered. For example, if one pixel is formed by the two light sources 1 and 2 and one pixel is formed by the two light sources 3 and 4, then light sources has the two-time density with respect to the density of pixels. Therefore, by changing a light amount ratio of the light sources that form one pixel, a barycentric position of the pixel can be shifted in the sub-scanning direction, which realizes high-accuracy image formation. In the present embodiment 20 light sources are provided and capable of 20-line image formation at one scan.

Figure 6:
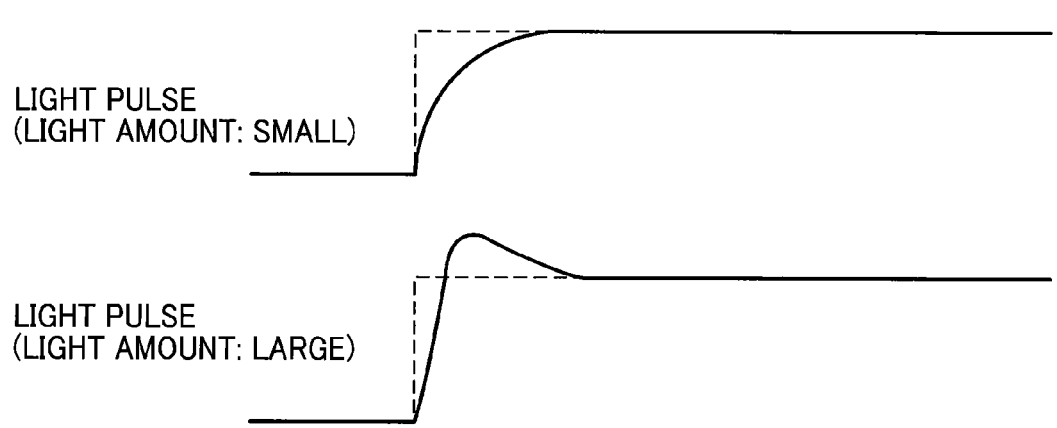
FIG. 6 is a diagram illustrating response characteristic of the VCSEL.

FIG. 6 is a diagram illustrating response characteristic of the VCSEL 88. When the light amount of light beam emitted from the light source in the VCSEL 88 is small, the rising edge of an optical pulse tends to become blunt. In this case, exposure energy becomes insufficient relative to a state where a theoretical light amount (ideal state) is indicated by dotted line in FIG. 6. Meanwhile, when the light amount of light beam emitted from the light source in the VCSEL 88 is large, the optical pulse tends to overshoot. In this case, the exposure energy becomes much more relative to the ideal state indicated by dotted line in FIG. 6. The response characteristic is different depending on, not only each light amount, but also each light source, or each VCSEL.

Figure 7:
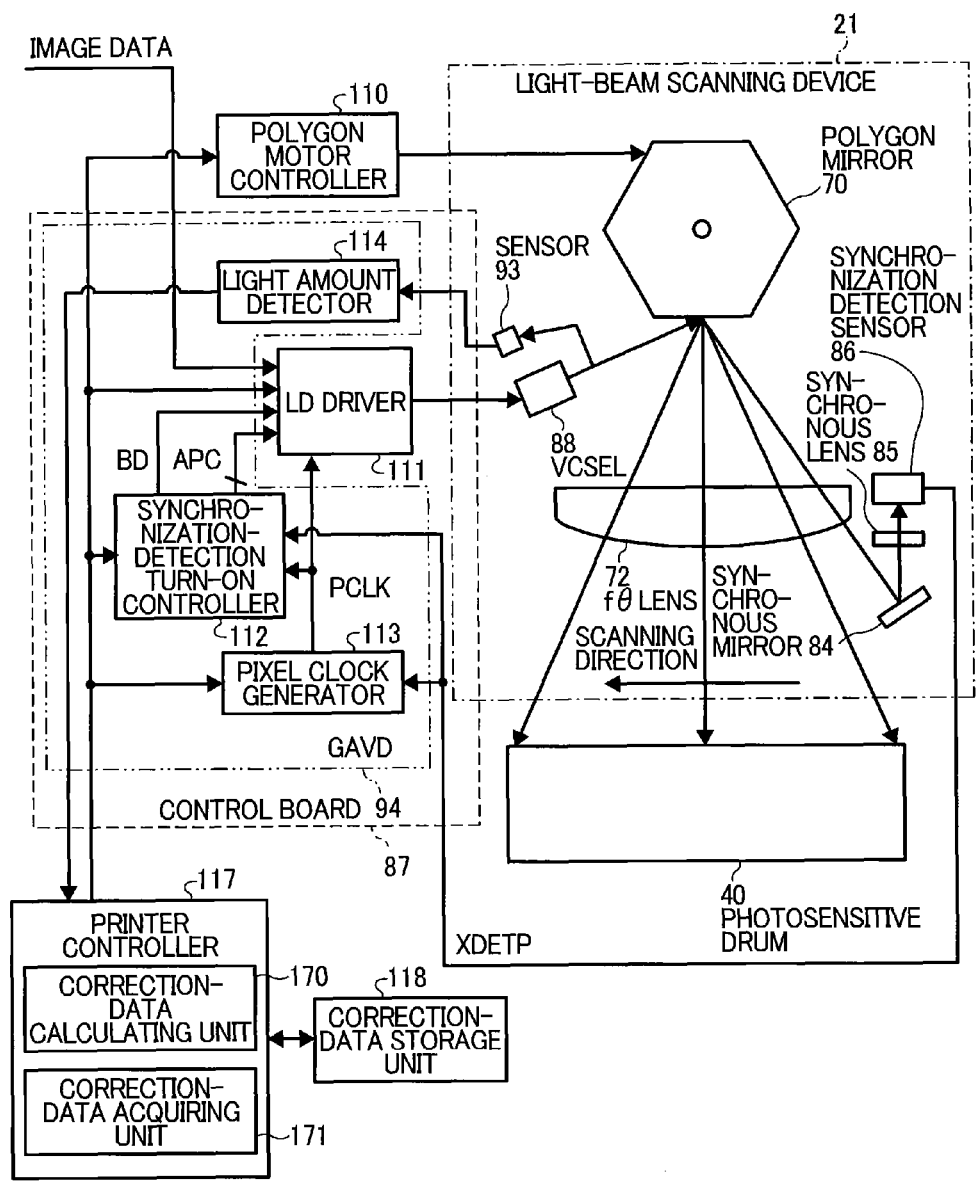
FIG. 7 is a configuration diagram of an image formation controller and a light-beam scanning device.

FIG. 7 is a configuration diagram of the image formation controller and the light-beam scanning device 21. The image formation controller includes a polygon motor controller 110, the light amount detector 114, the LD driver 111, a synchronization-detection turn-on controller 112, a pixel clock generator 113, a printer controller 117, and a correction-data storage unit 118. The light amount detector 114, the LD driver 111, the synchronization-detection turn-on controller 112, and the pixel clock generator 113 are provided in the control board 87. The control board 87 is provided for each of the colors. As shown in FIG. 7, GADV 94 includes the light amount detector 114, the synchronization-detection turn-on controller 112, and the pixel clock generator 113. The GADV 94 implements high resolution processing that divides image data sent from the image reading unit 300 in a spatial size so as to correspond to the emitting semiconductor laser element of the VCSEL 88. The light-beam scanning device 21 includes the polygon mirror 70, the fθ lens 72, the synchronous mirror 84, the synchronous lens 85, the synchronization detection sensor 86, the VCSEL 88, and the sensor 93.

In the light-beam scanning device 21, the light beam, emitted from the VCSEL 88 and penetrate the fθ lens 72, is reflected by the synchronous mirror 84 and converged by the synchronous lens 85, to enter the synchronization detection sensor 86. The synchronization detection sensor 86 is provided in the image writing side of the edge portion in the main scanning direction and detects the incident light beam. The light beam passes over the synchronization detection sensor 86, and the synchronous detection signal XDETP is thereby output from the synchronization detection sensor 86 and is fed to the pixel clock generator 113 and the synchronization-detection turn-on controller 112.

Figure 8:
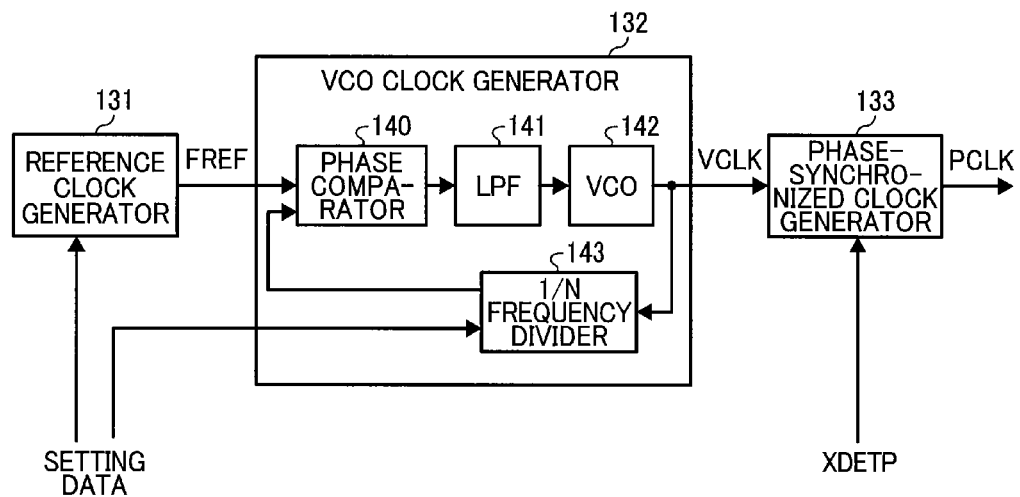
FIG. 8 is a diagram of a configuration of a pixel clock generator.

The pixel clock generator 113 generates a pixel clock PCLK synchronized with the synchronous detection signal XDETP, and feeds the generated pixel clock to the LD driver 111 and the synchronization-detection turn-on controller 112. FIG. 8 is a diagram of a configuration of the pixel clock generator 113. As shown in FIG. 8, the pixel clock generator 113 includes a reference clock generator 131, a VCO (Voltage Controlled Oscillator) clock generator 132, and a phase-locked clock generator 133. The VCO clock generator 132 includes a phase comparator 140, a LPF (low pass filter) 141, a VCO 142, and a 1/N frequency divider 143. The 1/N frequency divider 143 divides an oscillation frequency (VCLK) output from the VCO 142 by N.

A reference clock signal FREF output from the reference clock generator 131 and N divided signal of the VCLK by the 1/N frequency divider 143 are input to the phase comparator 140. The phase comparator 140 compares phases of the falling edge for both signals, and outputs an error component in a constant current. The LPF 141 removes any unnecessary high-frequency component and noise component, and outputs the signal to the VCO 142. The VCO 142 outputs the VCLK output dependent on the output of the LPF 141. Therefore, by changing the frequency of FREF sent from the printer controller 117 and a division ratio: N, the frequency of the VCLK can be fluctuated.

The phase-locked clock generator 133 generates the pixel clock signal PCLK synchronized with the synchronous detection signal XDETP, from the VCLK output generated by the VCO clock generator 132. In the pixel clock generator 113, the frequency is variable using setting data received from the printer controller 117.

In order to first detect the synchronous detection signal XDETP, the synchronization-detection turn-on controller 112 turns on a light-source forcing turn-on signal BD for synchronization detection and forcibly turn on the light source of the VCSEL 88. After the synchronization detection sensor 86 detects the synchronous detection signal XDETP, the synchronization-detection turn-on controller 112 uses the synchronous detection signal XDETP and the pixel clock PCLK to turn on the light source timely when the synchronous detection signal XDETP can be securely detected without generating a flare light. After detecting the synchronous detection signal XDETP, the synchronization-detection turn-on controller 112 generates a light-source forcing turn-on signal BD so as to turn on the light source, and transmits the light-source forcing turn-on signal BD to the LD driver 111. The synchronous detection signal XDETP is detected by turning on preset one of the light sources.

The light amount detector 114 detects an integrated light amount of light beams emitted from the VCSEL 88 for each turn-on pattern, from the light amount of the VCSEL 88 detected by the sensor 93.

The LD driver 111 controls the light amount and the turn-on time of the VCSEL 88 according to the image data synchronized with the light-source forcing turn-on signal BD and the pixel clock PCLK. The light beam emitted from the light source unit is deflected by the polygon mirror 70 and passes through the fθ lens 72 to scan the photo conductor drum 40.

Figure 9:
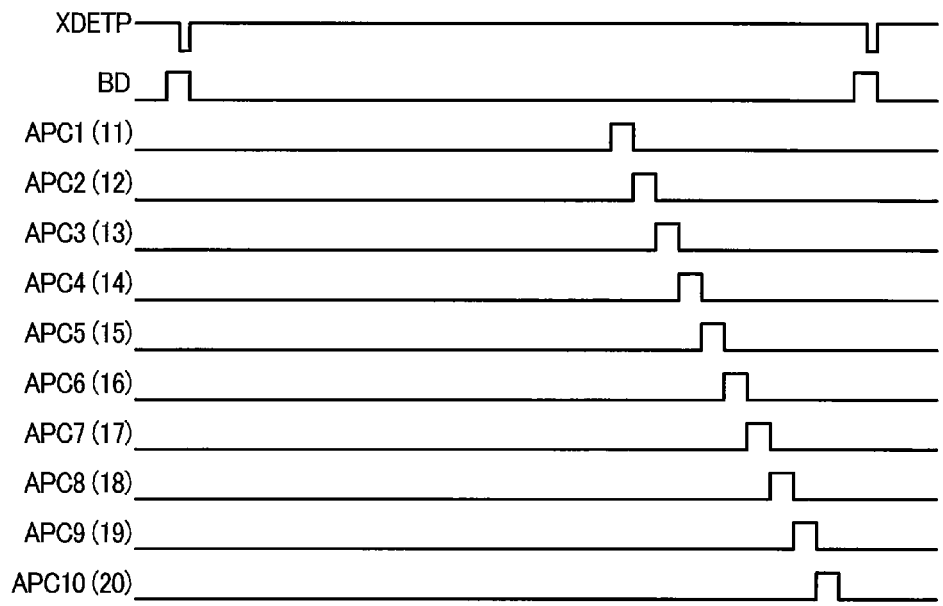
FIG. 9 is a diagram illustrating timing signals APC for light-amount control of the light sources in the VCSEL.

FIG. 9 is a diagram illustrating timing signals APC (auto-power control) for light-amount control of the light sources in the VCSEL 88. Timing signals APC 1 to 20 for light-amount control are generated by using the synchronous detection signal XDETP and the pixel clock PCLK. In addition, the timing signals APC 1 to 20 are generated in a non-image writing area where an image is not written. Because the light sources are configured as shown in FIG. 5, the timing signals APC 1 to 20 for light-amount control need to be generated at a different time. The present embodiment is configured to control the light amount of 10 light sources at one scan and to control the light amount of all the 20 light sources at two scans. Therefore, the APC 1 and APC 11, the APC 2 and APC 12, and so on, the APC 10 and APC 20 are the same timing signals, and are selected for each scan.

The auto-power control is a process for turning on each of the light sources at each timing of the timing signals (APC 1 to APC 20), detecting the light amount by the sensor 93, and controlling the light amount of the VCSEL 88 by the LD driver 111 so as to become a target light amount using the detected light amount. The VCSEL 88 can always emit a constant and stable amount of under the control. The sensor 93 is the same as the sensor for detecting the integrated light amount, and is commonly used.

The polygon motor controller 110 controls the polygon motor 71 (see FIG. 2) so as to rotate at a specified rotation number by the control signal received from the printer controller 117.

The printer controller 117 performs printing (image formation) control in the copy machine 100, and includes a correction-data calculating unit 170 and a correction-data acquiring unit 171.

When a target light amount being a target value of the light amount of a preset light source is changed and if the VCSEL 88 is changed from its turn-off status to its turn-on status, the correction-data calculating unit 170 compares an integrated light amount detected by the light amount detector 114 and a target integrated light amount being an integral of target light amounts for each turn-on pattern of the light sources in the VCSEL 88, and calculates correction data being a turn-on time of the light source corresponding to a difference between the amounts. For example, when the integrated light amount detected by the light amount detector 114 is less than the target value of the light amount by 10%, the correction-data calculating unit 170 calculates 10% of the turn-on time as correction data, and stores the calculated correction data in the correction-data storage unit 118.

Figure 10:
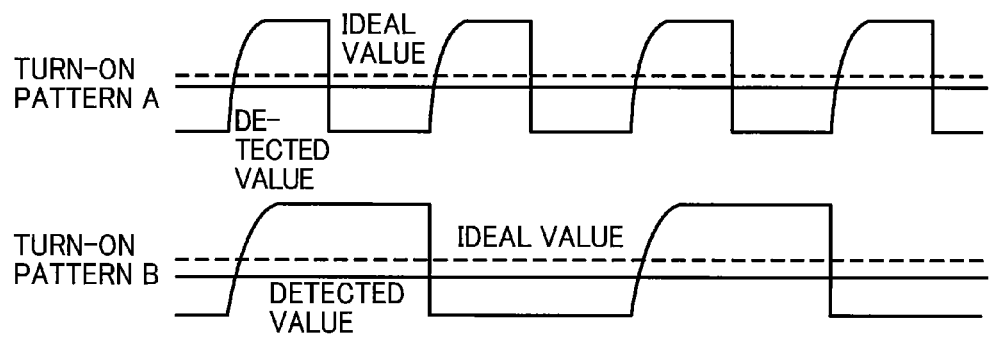
FIG. 10 is a diagram illustrating turn-on patterns of each integrated light amount.

FIG. 10 is a diagram illustrating turn-on patterns of each integrated light amount. Each of the turn-on patterns is a pattern in which the turn-on time and the turn-off time of a light source are repeated, and includes a turn-off time before turning on of the light source or a time during which the light is continuously on. A turn-on pattern A is a pattern in which one-dot ON (turn-on) and one-dot OFF (turn-off) are repeated, and shows an example in which the rising edge becomes blunt. In this example, because the rising of the turn-on level becomes slow, the detected value (solid line in FIG. 10) detected by the light amount detector 114 becomes lower than the ideal value of the integrated light amount indicated by the dotted line in FIG. 10. Therefore, if the ideal value is set as the target value, it is necessary to extend the turn-on time.

A turn-on pattern B is a pattern in which two-dot ON and two-dot OFF are repeated, and shows an example in which the rising edge becomes blunt similarly to the turn-on pattern A. In this case, because the rising of the turn-on level becomes also slow, the detected value (solid line in FIG. 10) detected by the light amount detector 114 becomes lower than the ideal value of the integrated light amount indicated by the dotted line in FIG. 10. Therefore, if the ideal value is set as the target value, it is necessary to extend the turn-on time. Besides, the turn-off time (OFF period) of the turn-on pattern B is longer than that of the turn-on pattern A, and this causes the rising edge becomes much blunt. Therefore, a difference between the ideal value and the detected value in the turn-on pattern B is larger than the difference between the ideal value and the detected value in the turn-on pattern A. Consequently, the turn-on time of the turn-on pattern B needs to be lengthened more than the turn-on time of the turn-on pattern A.

FIG. 10 illustrates the examples of the two turn-on patterns, the turn-on pattern A and the turn-on pattern B, however, the example is not limited thereto. By increasing variations of the overshooting turn-on pattern in a case of larger light amount or the like, actual image data can be appropriately corrected.

When the target light amount is changed, the correction-data acquiring unit 171 acquires the target light amount after changed and the correction data for the turn-on pattern corresponding to the image data from the correction-data storage unit 118. More specifically, the correction-data acquiring unit 171 checks the preset turn-on pattern with a pattern of a pixel value in the image data, and when the pattern of the image data is changed, selects a turn-on pattern nearest to the pattern of the image data, to acquire the selected turn-on pattern and the correction data corresponding to the target light amount from the correction-data storage unit 118.

Figure 11:
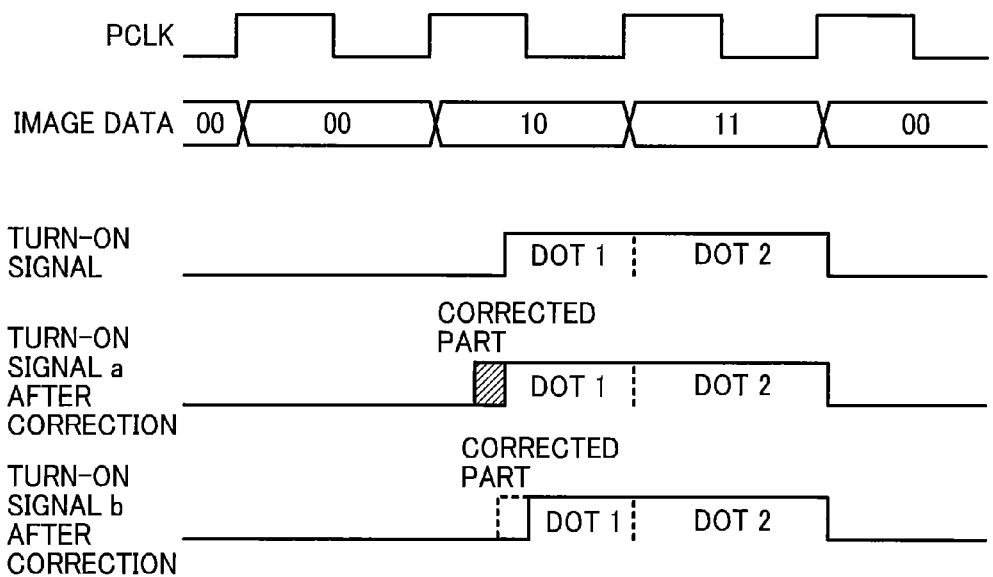
FIG. 11 is a diagram illustrating turn-on signals of image data.

FIG. 11 is a diagram illustrating turn-on signals of image data. The image data is 2 bits (quaternary), and the turn-on pulse width is set to 0, duty 33%, duty 66%, and duty 100%. The turn-on signal of the image data is the pattern of two-dot turn-off and two-dot turn-on, and the pattern of two-dot ON is continuous on duty 66% and duty 100%. This pattern is close to the turn-on pattern B in FIG. 10, and therefore a value (corrected value) of the correction data calculated from the turn-on pattern B is used for this image data.

For example, when the rising edge is so blunt as shown in FIG. 10, the turn-on pulse width is lengthened, and therefore a corrected part is added to the turn-on pulse of dot 1 like a turn-on signal a after correction. Meanwhile, when the rising overshoots, the turn-on pulse width is shortened, and therefore a corrected part is subtracted from the turn-on pulse of dot 1 like a turn-on signal b after correction.

The correction-data storage unit 118 stores therein a plurality of preset target light amounts and a plurality of correction data corresponding to a plurality of turn-on patterns, the correction-data calculating unit 170 stores the correction data in the correction-data storage unit 118, and the correction-data acquiring unit 171 reads the corrected target light amount and the correction data therefrom.

Furthermore, when the target light amount is changed in printing (in image formation), the LD driver 111 corrects the turn-on time of the light source in the VCSEL 88 using the correction data acquired by the correction-data acquiring unit 171 at the time of controlling the light source of the VCSEL 88 from the turn-off status to the turn-on status.

Figure 12:
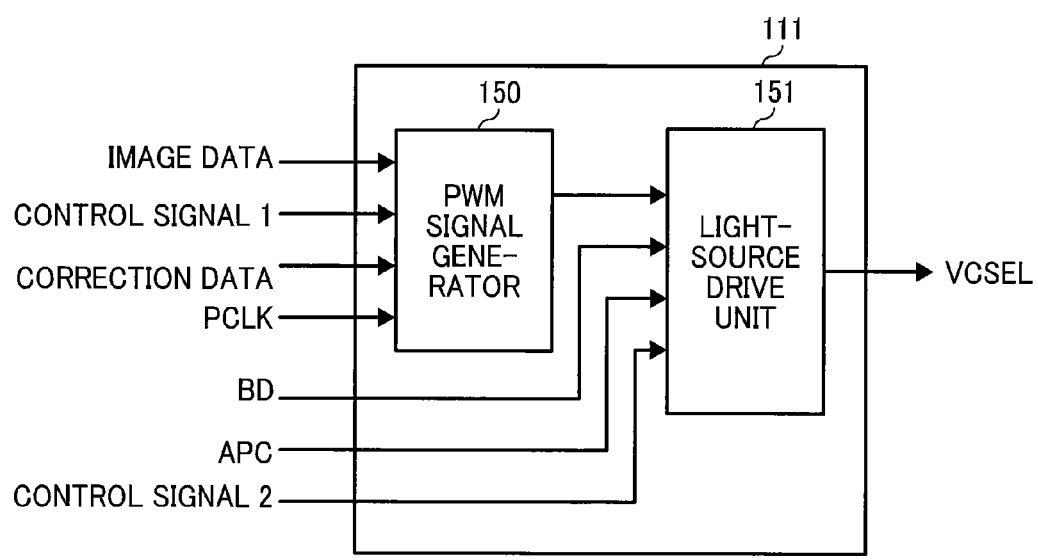
FIG. 12 is a diagram of a configuration of an LD driver.

FIG. 12 is a diagram of a configuration of the LD driver 111. As shown in FIG. 12, the LD driver 111 includes a pulse width modulation (PWM) signal generator 150 for controlling a turn-on time of each of the light sources in the VCSEL 88, and a light-source drive unit 151 that controls turn-on of the light sources.

The PWM signal generator 150 outputs the PWM signal to the light-source drive unit 151 based on the image data and a control signal 1 received from the printer controller 117. The light-source drive unit 151 turns on the light sources for only a time corresponding to the PWM signal. The control signal 1 is a selection signal of a pulse width corresponding to the number of grayscales (number of bits) of the image data. As explained above, the correction data is calculated as correction data for a pulse width from the integration of the light amounts of the light sources detected by the sensor 93, detected by the light amount detector 114 and from the target integrated light amount.

The synchronization-detection turn-on controller 112 transmits the light-source forcing turn-on signal BD to the light-source drive unit 151, so that the light-source drive unit 151 turns on light sources for only the time. In addition, the synchronization-detection turn-on controller 112 transmits the timing signals APC for light-amount control to execute the APC operation of the light sources, to the light-source drive unit 151, so that the light-source drive unit 151 controls the light amount of each of the light sources at a timing of the timing signal APC for light-amount control. The light amount at the time of turning on each of the light sources is set by a control signal 2 received from the printer controller 117.

Figure 13:
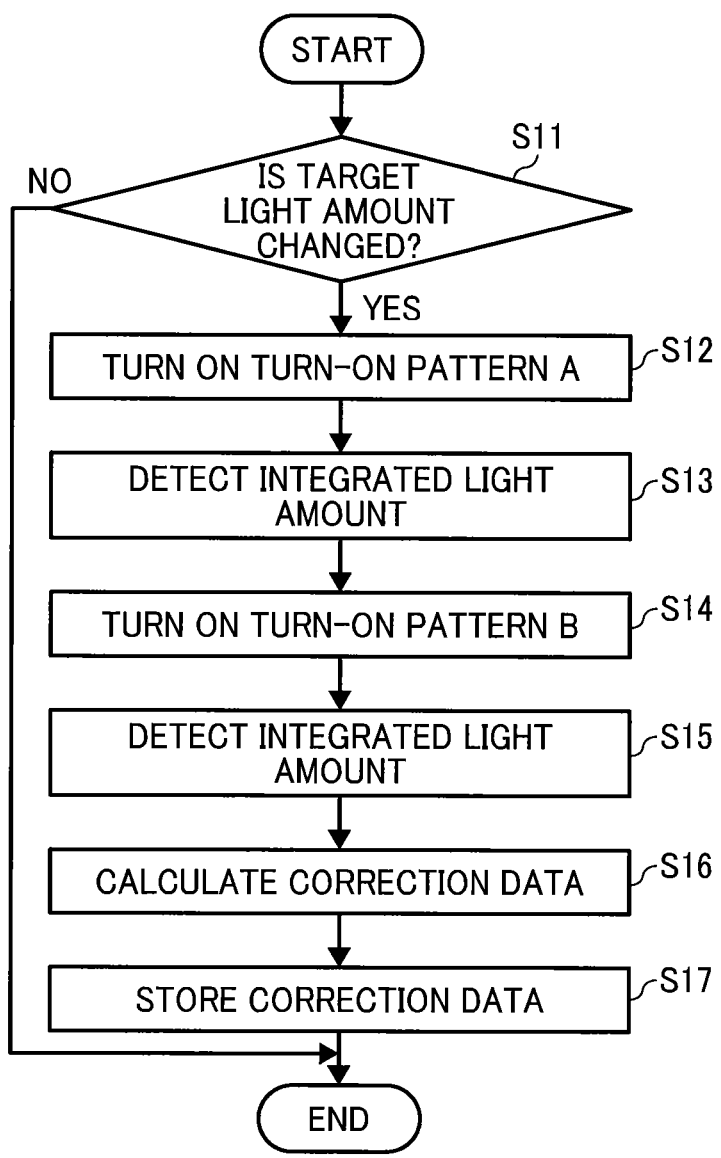
FIG. 13 is a flowchart illustrating a procedure of a correction-data calculation process implemented by a multifunction product according to the first embodiment.

Next, a procedure of a correction-data calculation process used to correct the turn-on time of the VCSEL 88 according to the image data by a multifunction product 100 configured as above will be explained below. FIG. 13 is a flowchart illustrating the procedure of the correction-data calculation process implemented by the multifunction product 100 according to the first embodiment.

First, the printer controller 117 determines whether the target light amount of the light sources in the VCSEL 88 is changed (Step S11). The imaging conditions set upon printing are stored in a recording medium such as memory (not shown), and the printer controller 117 can determine whether the target light amount has been changed by referring to the memory. When the target light amount is not changed (No at Step S11), the process is ended.

Meanwhile, when the target light amount is changed (Yes at Step S11), the LD driver 111 turns on the turn-on pattern A in the VCSEL 88 (Step S12). The light amount detector 114 detects the integrated light amount of the VCSEL 88 turned on as the turn-on pattern A (Step S13).

Next, the LD driver 111 turns on the turn-on pattern B in the VCSEL 88 (Step S14). The light amount detector 114 detects the integrated light amount of the VCSEL 88 turned on as the turn-on pattern B (Step S15).

The correction-data calculating unit 170 compares the detected integrated light amount and the preset target integrated light amount of the VCSEL 88 for each turn-on pattern of the VCSEL 88, calculates correction data corresponding to a difference therebetween (Step S16), and stores the data in the correction-data storage unit 118 (Step S17). Here, there is shown the example in which the correction data for the two turn-on patterns such as the turn-on pattern A and the turn-on pattern B are calculated, however, the correction data for all the preset turn-on patterns are calculated in actual cases.

Figure 14:
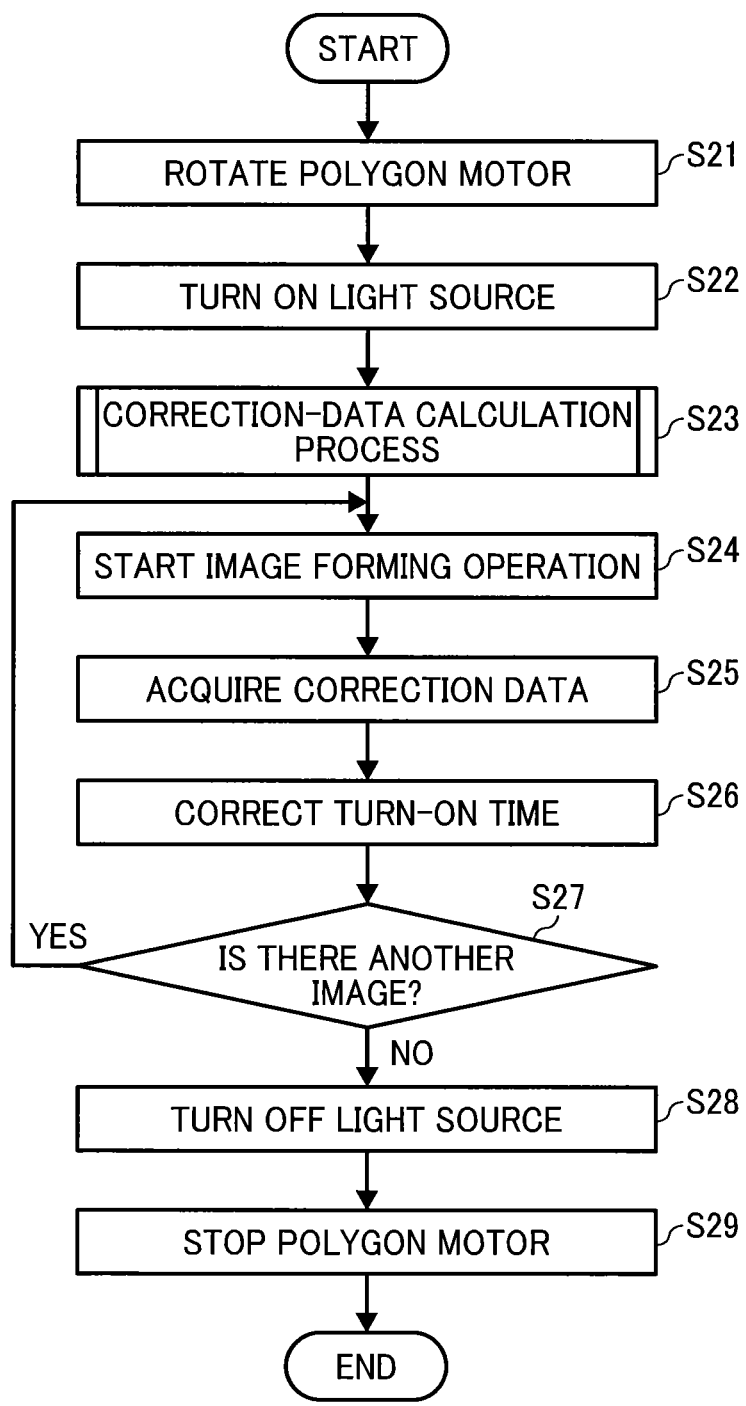
FIG. 14 is a flowchart illustrating a procedure of a printing process implemented by the multifunction product according to the first embodiment.

A procedure of the printing process including the correction of the turn-on time implemented by the multifunction product 100 according to the first embodiment will be explained next. FIG. 14 is a flowchart illustrating the procedure of the printing process implemented by the multifunction product 100 according to the first embodiment.

First, when the printing is started, the polygon motor controller 110 rotates the polygon motor 71 at a specified rotation number (Step S21). The LD driver 111 turns on the preset light sources of the VCSEL 88 in order to output the synchronous detection signal (Step S22), and the synchronization detection sensor 86 transmits the synchronous detection signal.

Next, the correction-data calculation process shown in FIG. 13 is performed (Step S23). The printer controller 117 starts the image forming operation (Step S24). The correction-data acquiring unit 171 acquires the correction data for the turn-on pattern corresponding to the image data to be printed, from the correction-data storage unit 118 (Step S25). The LD driver 111 corrects the turn-on time of the light sources in the VCSEL 88 by the acquired correction data (Step S26). The LD driver 111 turns on the light sources in the VCSEL 88 for which turn-on time is corrected, and the image is thereby formed.

Next, the printer controller 117 determines whether there is another image (Step S27). If there is another image (Yes at Step S27), the printer controller 117 returns to Step S24 and repeats the process. Meanwhile, if there is no another image (No at Step S27), the LD driver 111 turns off the light sources of the VCSEL 88 (Step S28), and the polygon motor controller 110 stops the polygon motor 71 (Step S29).

As explained above, when the target light amount of the VCSEL 88 is changed at the time of starting printing, the multifunction product 100 according to the first embodiment calculates correction data for correcting the turn-on time for each turn-on pattern of the VCSEL 88. The turn-on time is then corrected in printing by the correction data for the turn-on pattern corresponding to the image data. This allows appropriate correction of the VCSEL 88 corresponding to the image data in accordance with the response characteristic of the VCSEL 88, thus improving and stabilizing image quality. In addition, the correction data under the conditions is previously calculated and stored, and the printing time can thereby be reduced. Moreover, the sensor for detecting the amount of light when the target light amount of the VCSEL 88 is to be controlled and the sensor for detecting the integrated light amount are commonly used, which results in simple configuration of the device, thus achieving cost reduction.

Second Embodiment

In the first embodiment, the correction data is calculated when the target light amount of the VCSEL 88 is changed at the time of starting printing. However, in a second embodiment, the correction data is calculated when the target light amount is changed by a predetermined change amount or more. The configuration of a multifunction product 100 is the same as that of the first embodiment.

Figure 15:
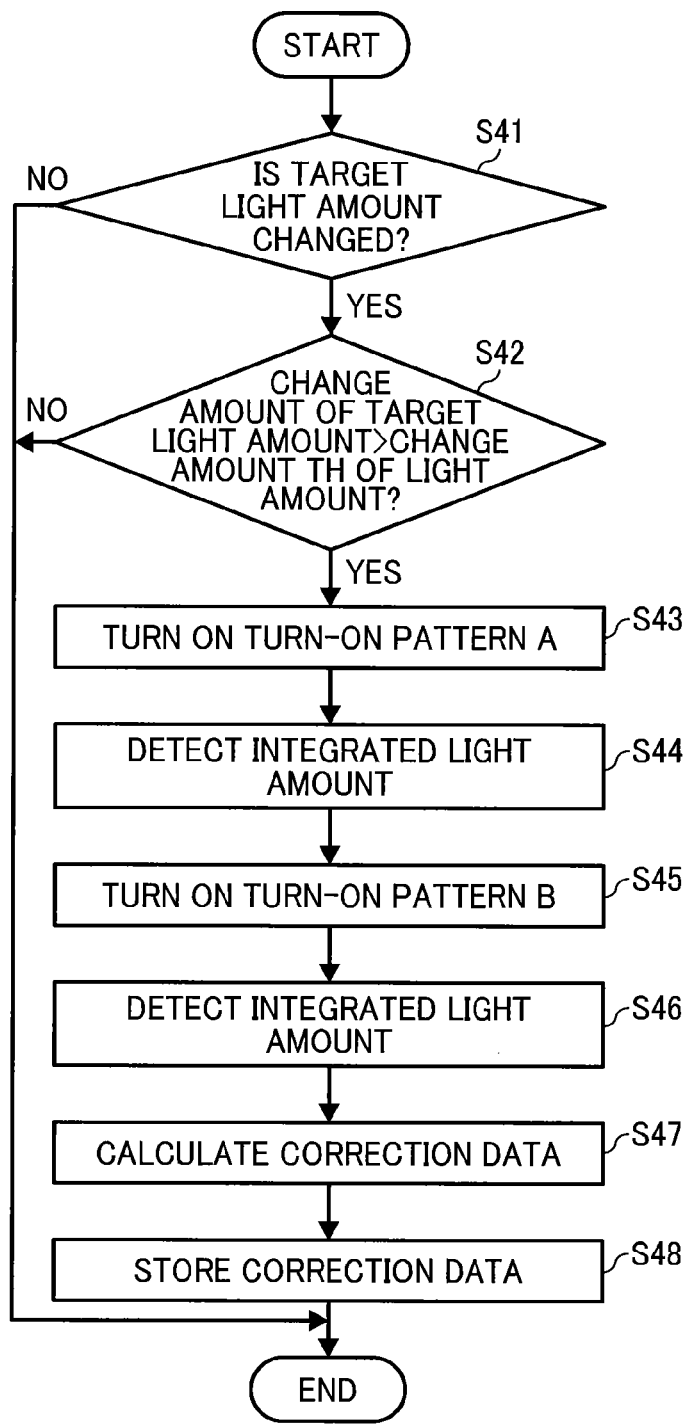
FIG. 15 is a flowchart illustrating a procedure of a correction-data calculation process implemented by a multifunction product according to a second embodiment.

FIG. 15 is a flowchart illustrating a procedure of a correction-data calculation process implemented by the multifunction product 100 according to the second embodiment.

First, the printer controller 117 determines whether the target light amount of the light sources in the VCSEL 88 is changed (Step S41). How to determine is the same as that of the first embodiment. If the target light amount is not changed (No at Step S41), the process is ended.

Meanwhile, if the target light amount is changed (Yes at Step S41), the printer controller 117 further determines whether the change amount of the changed target light amount is larger than a predetermined change amount TH of the light amount (Step S42). Here, the change amount TH of the light amount represents a change amount which is determined depending on whether a difference between the detected integrated light amount and the target light amount is at some level that is not influential on the image. If the change amount TH of the light amount is large, the number of calculations of the correction data decreases, and thus the number of times of executing the correction of the turn-on time of the VCSEL 88 decreases, which enables the printing time in the multifunction product 100 to be reduced.

If the change amount of the target light amount is equal to or less than the change amount TH of the light amount (No at Step S42), the process is ended. Meanwhile, if the change amount of the target light amount is larger than the change amount TH of the light amount (Yes at Step S42), then the LD driver 111 turns on the turn-on pattern TH in the VCSEL 88 (Step S43). The processes (Steps S44 to S48) starting at detecting of the integrated light amount of the VCSEL 88 are the same as those of the first embodiment, and thus explanation thereof is omitted (See Steps S13 to S17 in FIG. 13).

As explained above, when the change amount of the target light amount of the VCSEL 88 at the time of starting printing is larger than the predetermined change amount TH of the light amount, the multifunction product 100 according to the second embodiment calculates correction data for correcting the turn-on time, for each turn-on pattern of the VCSEL 88. Then, the turn-on time is corrected in printing by the correction data for the turn-on pattern corresponding to the image data. This allows appropriate correction of the VCSEL 88 corresponding to the image data in accordance with the response characteristic of the VCSEL 88. As a result, the image quality can be improved and stabilized, and the number of times for executing the correction of the turn-on time of the VCSEL 88 can be reduced, thus reducing the printing time.

In the first and the second embodiments, as a timing of calculating and storing the correction data for the turn-on time, these operations are executed before the printing is started at which the target light amount may be largely changed. However, the device may be configured to execute these operations between printing and printing or upon process control forcibly executed from an external device. Before the printing is started, there may be a case where the target light amount is set by changing the target light amount determined by the process control or by changing the setting of the printing. When the process control is executed, there may be a case where the target light amount is set at the time of forming the image pattern used for the process control.

Third Embodiment

In the first embodiment, the image data is 2 bits (quaternary), and the turn-on pulse width is set to 0, duty 33%, duty 66%, and duty 100%. On the other hand, in a third embodiment, the image data is 2 bits (quaternary), and the turn-on pulse width is set to 0, duty 25%, duty 50%, and duty 75%, and a case where duty 100% is not used is explained below. The configuration of a multifunction product 100 is the same as that of the first embodiment.

Figure 16:
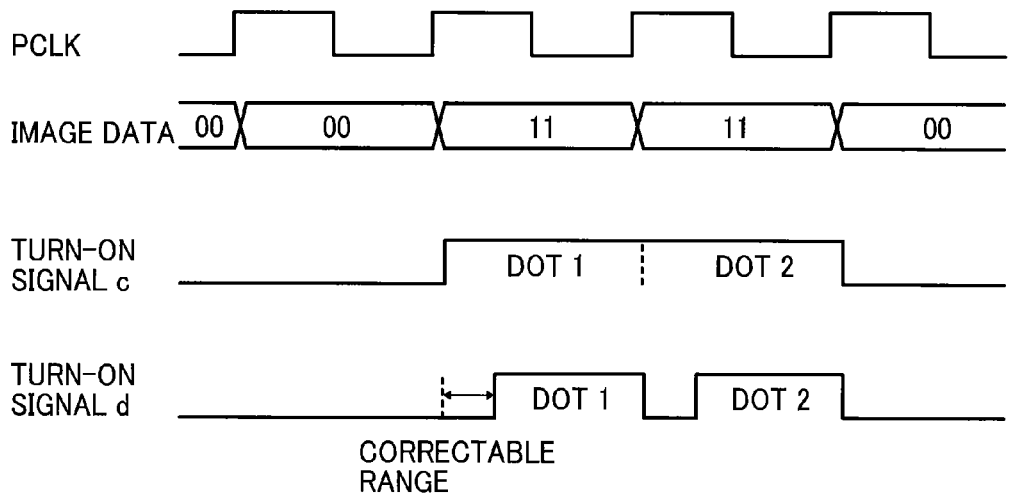
FIG. 16 is a diagram illustrating turn-on signals of image data.

FIG. 16 is a diagram illustrating turn-on signals of image data. A turn-on signal c shown in FIG. 16 indicates a case as a compared object where the turn-on pulse width is duty 100%. If the turn-on pulse width is duty 100% or less, the turn-on pulse width can be easily lengthened or shortened with respect to a target dot to be corrected. A turn-on signal d shown in FIG. 16 indicates an example where the turn-on pulse width can be longer by duty 25% (see a correctable range in FIG. 16), however, this amount is determined in the case on the assumption of the worst response characteristic.

Fourth Embodiment

Figure 17:
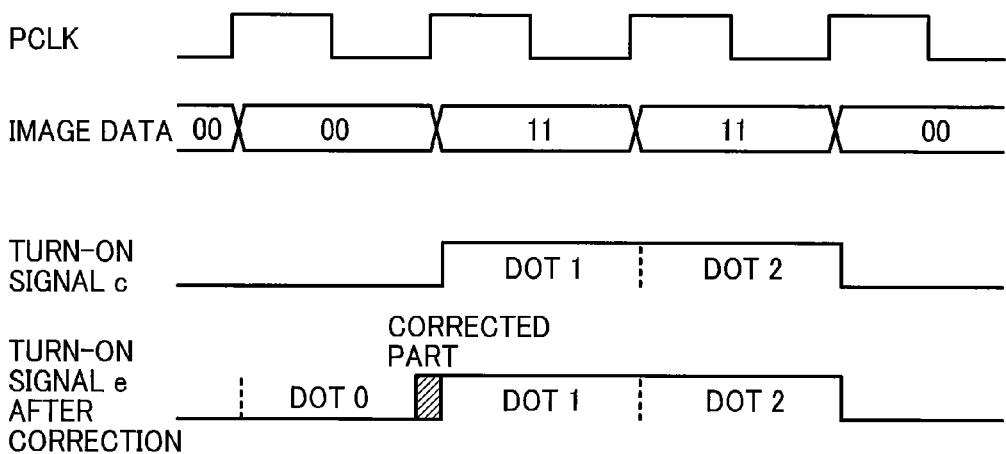
FIG. 17 is a diagram illustrating turn-on signals of image data.

In a fourth embodiment, an example where the turn-on pulse width is lengthened when the turn-on pulse width is duty 100% similarly to the first embodiment will be explained below. FIG. 17 is a diagram illustrating turn-on signals of image data. A turn-on signal c shown in FIG. 17 indicates an example, similarly to that of FIG. 16, where the turn-on pulse width is duty 100%. If the turn-on pulse width of duty 100% is lengthened, as shown in the turn-on signal e, only a corrected part of a previous turn-off of the correction target dot is turned on. When the turn-off dot is turned on, the turn-on pulse is shifted to the side of a correction target dot, and a stable dot can thereby be formed.

Fifth Embodiment

Figure 18:
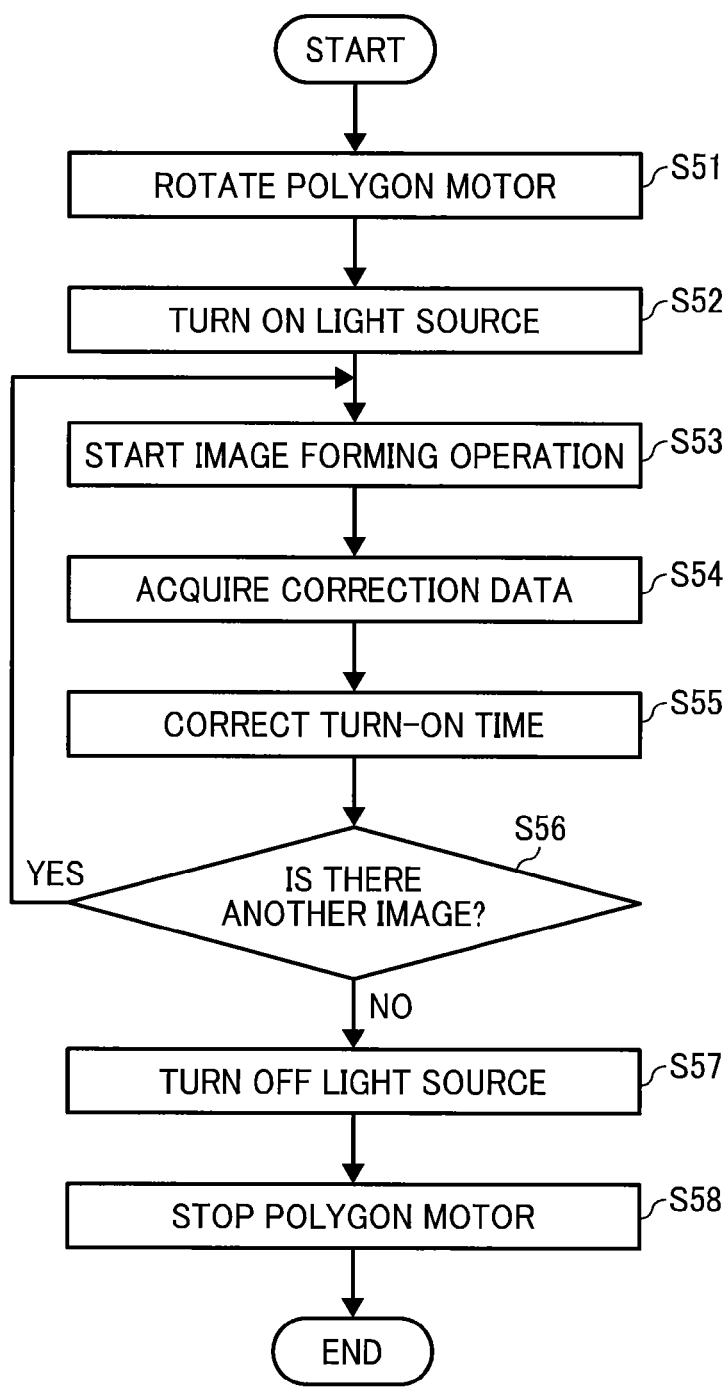
FIG. 18 is a flowchart illustrating a procedure of a printing process implemented by a multifunction product according to a fifth embodiment.

In the first embodiment, the correction data is calculated and stored for each turn-on pattern after the printing is started. On the other hand, the correction data may be previously calculated and stored upon shipment of the multifunction product 100. FIG. 18 is a flowchart illustrating a procedure of a printing process implemented by a multifunction product 100 according to a fifth embodiment.

First, the correction-data calculation process (FIG. 13) according to the first embodiment is executed upon the shipment of the multifunction product 100. The printing process in FIG. 18 is then executed. The printing processes shown in FIG. 18 (Steps S51 to S58) are those in which the correction-data calculation process shown in FIG. 14 (see Step S23) is omitted (See Steps S21 to S29 in FIG. 14).

As explained above, the multifunction product 100 according to the fifth embodiment corrects, in the printing, the turn-on time using the correction data, for the turn-on pattern corresponding to the image data, calculated and stored upon shipment. This allows appropriate correction of the image data, thus improving and stabilizing the image quality.

The first to the fifth embodiments have explained the image forming apparatus to which the present invention is applied using the copy machine 100. However, the image forming apparatus applied with the present invention is not limited to the copy machine, and thus, can be applied to a multifunction product having at least two functions of a copy function, a printer function, a scanner function, and a facsimile function, and can also be applied to a printer and a facsimile device. Moreover, the image forming apparatus is not necessarily limited to an electrophotographic system using the intermediate transfer system, and may therefore be a direct transfer system.

According to an aspect of the present invention, there is such an effect that the amount of light of the light sources can be appropriately corrected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
 a light source that emits light beams for scanning a photoconductive element and for image forming of image data;
 a storage unit that stores a correction amount of a turn-on time of the light source associated with a preset turn-on pattern of the light beams;
 an acquiring unit that compares a pattern of the image data with the turn-on pattern, so as to acquire the correction amount corresponding to the pattern of the image data which is associated with the turn-on pattern, from the storage unit;
 a light source controller that controls turn-on of the light source by a turn-on time corrected with acquired correction amount;
 a light amount detector configured to detect an integrated light amount of the light beams emitted from the light source for each turn-on pattern, the light source being a VCSEL having a plurality of light sources, which collectively are detected and subsequently corrected; and
 a calculating unit configured to calculate a turn-on time of the light source, as the correction amount, corresponding to a difference between detected integrated light amount and an integrated target light amount which is an integral of target light amounts, each of which is a preset target value of the light amount of the light source, and stores calculated turn-on time in the storage unit.

2. The image forming apparatus according to claim 1, wherein the calculating unit is further configured to calculate, when imaging conditions for image formation are changed, a turn-on time of the light source, as the correction amount, corresponding to the difference between detected integrated light amount and the target integrated light amount for each turn-on pattern, and stores calculated turn-on time in the storage unit.

3. The image forming apparatus according to claim 2, wherein the calculating unit is further configured to calculate, when the target light amount included in the imaging conditions is changed, a turn-on time of the light source, as the correction amount, corresponding to the difference between detected integrated light amount and the target integrated light amount for each turn-on pattern, and stores calculated turn-on time in the storage unit.

4. The image forming apparatus according to claim 3, wherein the calculating unit is further configured to calculate, when the target light amount is changed by a preset change amount or more, a turn-on time of the light source, as the correction amount, corresponding to the difference between detected integrated light amount and the target integrated light amount for each turn-on pattern, and stores calculated turn-on time in the storage unit.

5. The image forming apparatus according to claim 1, wherein the turn-on pattern includes a turn-off time prior to turn-on of the light source and a continuous turn-on time.

6. The image forming apparatus according to claim 5, wherein the turn-on pattern is a pattern in which the light source changes from its turn-off status to its turn-on status.

7. The image forming apparatus according to claim 1, wherein the calculating unit is further configured to calculate the correction amount right before image formation, between image formation and subsequent image formation, or upon process control forcibly executed from an external device, and stores calculated correction amount in the storage unit.

8. The image forming apparatus according to claim 1, further comprising a sensor that detects a light amount of the light source, wherein
the light amount detector detects the integrated light amount by the light amount detected by the sensor, and
the light source controller controls the light amount of the light source so as to be the target light amount, based on the light amount detected by the sensor.

9. The image forming apparatus according to claim 1, wherein the light source controller controls turn-on duty of the light source including a correction amount obtained by correcting the turn-on time of the light source so as to be 100% or less according to pulse width modulation ("PWM").

10. The image forming apparatus according to claim 1, wherein when the turn-on time of the light source is corrected to be longer, the light source controller controls turn-on of an adjacent dot being turned off.

11. The image forming apparatus according to claim 10, wherein the light source controller controls, when the control is provided so that the adjacent dot being turned off is turned on, so as to shift a turn-on pulse to a dot side as an object to be corrected.

12. A turn-on time correction method implemented by an image forming apparatus, the image forming apparatus including: a light source that emits light beams for scanning a photoconductive element and for image forming of image data, and a storage unit that stores a correction amount of a turn-on time of the light source associated with a preset turn-on pattern of the light beams, and the turn-on time correction method comprising:
comparing a pattern of the image data with the turn-on pattern, and acquiring the correction amount corresponding to the pattern of the image data which is associated with the turn-on pattern, from the storage unit;
controlling turn-on of the light source by a turn-on time corrected with acquired correction amount;
detecting an integrated light amount of the light beams emitted from the light source for each turn-on pattern, the light source being a VCSEL having a plurality of light sources, which collectively are detected and subsequently corrected; and
calculating a turn-on time of the light source, as the correction amount, corresponding to a difference between detected integrated light amount and an integrated target light amount which is an integral of target light amounts, each of which is a preset target value of the light amount of the light source, and storing calculated turn-on time in the storage unit.

13. The turn-on time correction method according to claim 12, wherein, when imaging conditions for image formation are changed, the turn-on time of the light source is calculated, as the correction amount, corresponding to the difference between detected integrated light amount and the integrated target light amount for each turn-on pattern, and the calculated turn-on time is stored in the storage unit.

14. The turn-on time correction method according to claim 13, wherein, when a target light amount included in the imaging conditions is changed, the turn-on time of the light source is calculated, as the correction amount, corresponding to the difference between detected integrated light amount and the integrated target light amount for each turn-on pattern, and the calculated turn-on time is stored in the storage unit.

15. The turn-on time correction method according to claim 14, wherein, when the target light amount is changed by a preset change amount or more, the turn-on time of the light source is calculated, as the correction amount, corresponding to the difference between detected integrated light amount and the integrated target light amount for each turn-on pattern, and the calculated turn-on time stored in the storage unit.

16. The turn-on time correction method according to claim 12, wherein the light source controller controls turn-on duty of the light source including a correction amount obtained by correcting the turn-on time of the light source so as to be 100% or less according to pulse width modulation ("PWM").

17. The turn-on time correction method according to claim 12, wherein the turn-on time correction method further comprising, when the turn-on time of the light source is corrected to be longer, controlling turn-on of an adjacent dot being turned off.

18. The turn-on time correction method according to claim 17, wherein the turn-on time correction method further comprising, when the control is provided so that the adjacent dot being turned off is turned on, controlling so as to shift a turn-on pulse to a dot side as an object to be corrected.

19. An image forming apparatus comprising:
light beam scanning means for scanning light beams of a light source on a photoconductive element to form an image for image data;
storage means for storing a correction amount of a turn-on time of the light beam scanning means associated with a preset turn-on pattern of the light beams; and
acquiring means for comparing a pattern of the image data with the turn-on pattern so as to acquire the correction amount corresponding to the pattern of the image data which is associated with the turn-on pattern, from the storage unit;

light source control means for controlling turn-on of the light source by a turn-on time corrected with acquired correction amount;

light amount detector means for detecting an integrated light amount of the light beams emitted from the light source for each turn-on pattern, the light source being a VCSEL having a plurality of light sources, which collectively are detected and subsequently corrected; and calculating means for calculating a turn-on time of the light source, as the correction amount, corresponding to a difference between detected integrated light amount and an integrated target light amount which is an integral of target light amounts, each of which is a preset target value of the light amount of the light source, and for storing calculated turn-on time in the storage unit.

* * * * *